(12) United States Patent  (10) Patent No.: US 7,564,447 B2
Lin  (45) Date of Patent: Jul. 21, 2009

(54) SYSTEM AND METHOD FOR MEASURING OPERATIONAL LIFE OF A COMPUTER MOUSE

(75) Inventor: Guang-Hong Lin, Guangdong (CN)

(73) Assignees: Hong Fu Jin Precision Industry (Shen Zhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 545 days.

(21) Appl. No.: 11/309,468

(22) Filed: Aug. 10, 2006

(65) Prior Publication Data

US 2007/0075972 A1    Apr. 5, 2007

(30) Foreign Application Priority Data

Sep. 30, 2005   (CN) ........................ 2005 1 0100106

(51) Int. Cl.
    *G09G 5/08* (2006.01)
(52) U.S. Cl. ....................... 345/163; 345/166
(58) Field of Classification Search .......... 345/163–166
    See application file for complete search history.

(56) References Cited

U.S. PATENT DOCUMENTS 7,006,953 B2 *   2/2006   Takemura et al. .............. 703/2

2003/0201951 A1   10/2003   Chin
2005/0200606 A1 *   9/2005   Willemin et al. ............ 345/166

FOREIGN PATENT DOCUMENTS

| TW | 290138 | 11/1996 |
| TW | M252018 | * 12/2004 |
| TW | 1228668 | 3/2005 |

* cited by examiner

*Primary Examiner*—Jimmy H Nguyen
(74) *Attorney, Agent, or Firm*—Winston Hsu

(57) ABSTRACT

An exemplary system for measuring operational life of a computer mouse is disclosed. The system includes a computer (10), a servo controller (14), an X servo axis (12), a Y servo axis (13), and a measurement platform (16). The computer includes a file module (20), a setting module (21), and a performing module (22). The file module is configured for creating a new file for the computer mouse. The setting module is configured for setting running tasks for the computer mouse. The performing module is configured for signaling the computer to send an instruction to the servo controller, making the servo controller process the instruction and send a control signal to the X servo axis and the Y servo axis respectively, and making the X servo axis and the Y servo axis drive the computer mouse to move according to the running tasks. A related method is also disclosed.

10 Claims, 3 Drawing Sheets

SYSTEM AND METHOD FOR MEASURING OPERATIONAL LIFE OF A COMPUTER MOUSE

FIELD OF THE INVENTION

The present invention is generally related to systems and methods for measuring operational life of computer peripheral devices, and more particularly, is related to a system and method for measuring operational life of a computer mouse.

DESCRIPTION OF RELATED ART

A computer mouse is a small object able to slide along a hard, flat surface. As you move the computer mouse, the pointer on the display screen is configured to move in the same direction. A computer mouse contains at least one button and sometimes as many as three, each button having different functions depending on what computer program is running. There are three basic types of computer mice, mechanical, optomechanical, and optical. A mechanical mouse has a rubber or a metal ball in its underside configured to roll in all directions. The mechanical mouse has mechanical sensors to detect a rolling direction of the ball and moves the screen pointer accordingly. An optomechanical mouse is similar to the mechanical mouse, but uses optical sensors to detect the rolling direction of the ball. An optical mouse uses a laser to detect the mouse's movement. The mouse must move along a special surface so that the optical mechanism has a frame of reference. Optical mice have no moving mechanical parts. They respond more quickly and accurately than mechanical and optomechanical mice, but they are also more expensive.

With the rapid development of computers, an operational expectation for every accessory of a computer is required to possess a better precision and a better mobility than their previous models. A stability and an operational life of the computer mouse are also important. In fact, the production process of a computer mouse is relatively easy. What is important is that the computer mouse must pass many strict requirements before leaving factories. These requirements include function measurement, reliability measurement, and so on. The reliability measurement further includes a life expectancy measurement of key-presses, operational life measurement of a computer mouse and so on. However, nowadays, many measurements for a computer mouse is not applied, more particularly, there is a lack of professional systems and methods for measuring the operational life of the computer mouse.

Therefore, what is needed is a system and method for measuring operational life of the computer mouse accurately and reliably.

SUMMARY OF THE INVENTION

One embodiment provides a system for measuring operational life of a computer mouse. The system includes a computer, a servo controller, an X servo axis, a Y servo axis, and a measurement platform with the measured computer mouse fixed in. The X servo axis and the Y servo axis both lay on the measurement platform. The computer is configured for setting an aggregated running distance for the computer mouse fixed in the measurement platform according to a standard operational life specification of the computer mouse, setting running tasks for the computer mouse according to the aggregated running distance; and sending an instruction for controlling operations of measuring operational life of the computer mouse according to the running tasks. The servo controller is connected with the computer, configured for receiving and processing the instruction from the computer, sending a control signal to an X servo axis and a Y servo axis in the measurement platform respectively, and making the X servo axis and the Y servo axis drive the computer mouse to run according to the running tasks, in order to check whether the computer mouse completes the running tasks to meet the computer mouse's standard operational life specification.

Another embodiment provides a method for measuring operational life of a computer mouse. The method includes the steps of: (a) initializing a communication port for a computer, in order that the computer communicates with a servo controller via the communication port; (b) setting an aggregated running distance for the computer mouse fixed in a measurement platform according to the computer mouse's operational life specification; (c) setting running tasks for the computer mouse according to the aggregated running distance; (d) sending an instruction for controlling operations of measuring operational life of the computer mouse according to the running tasks; (e) receiving and processing the instruction from the computer, and sending a control signal to an X servo axis and a Y servo axis in the measurement platform respectively; and (f) making the X servo axis and the Y servo axis drive the computer mouse to move according to the running tasks, in order to check whether the computer mouse completes the running tasks to meet the computer mouse's standard operational life specification.

Other objects, advantages and novel features of the embodiments will be drawn from the following detailed description together with the attached drawings, in which:

DETAILED DESCRIPTION

Figure 1:
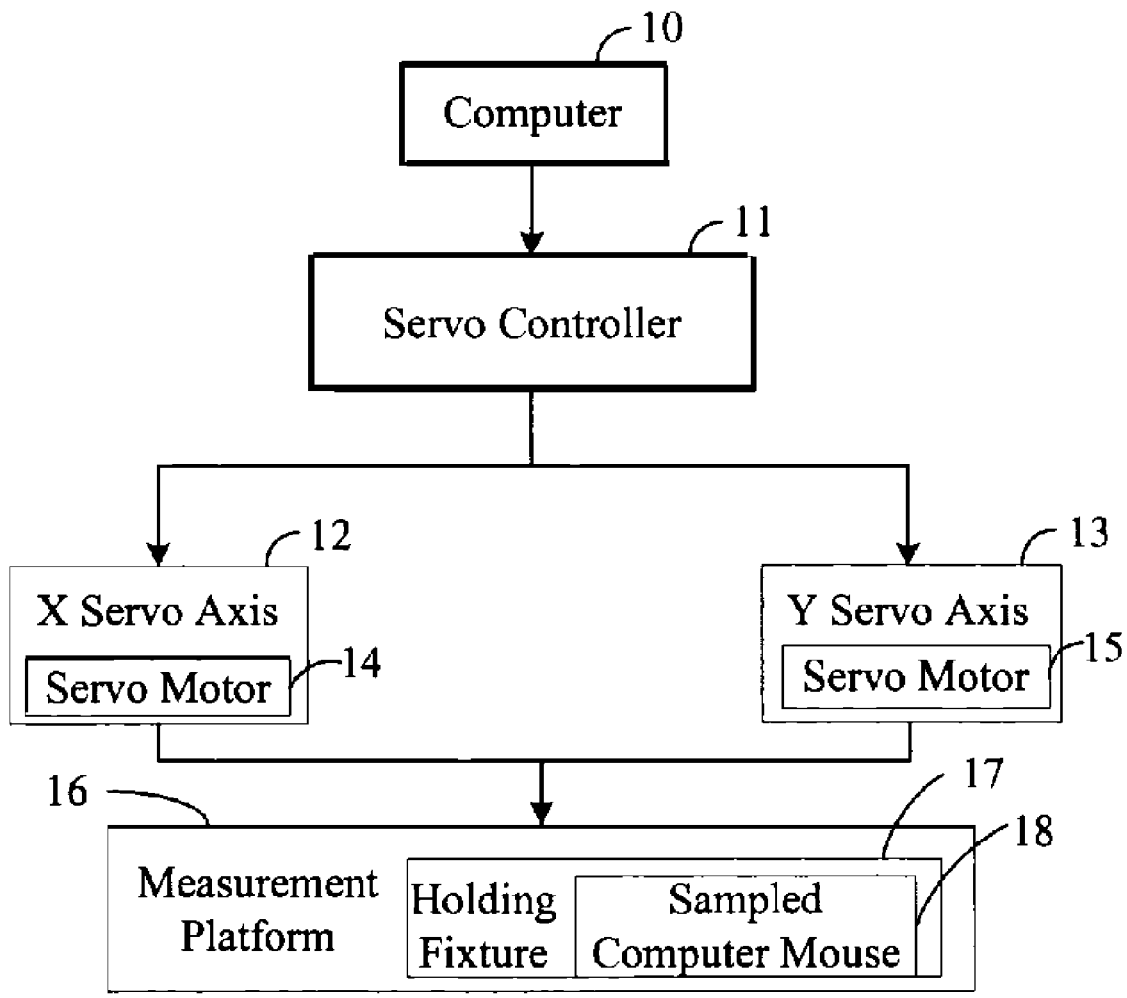
FIG. 1 is a schematic diagram of a hardware configuration of a system for measuring operational life of a computer mouse in accordance with a preferred embodiment.

FIG. 1 is a schematic diagram of a hardware configuration of a system for measuring an operational life of a computer mouse (hereinafter, "the system") in accordance with a preferred embodiment. The system includes a sampled computer mouse 18, a computer 10, a servo controller 11, an X servo axis 12, a Y servo axis 13, and a measurement platform 16. The X servo axis 12 and the Y servo axis 13 both lay on the measurement platform 16. A first servo motor 14 and a second servo motor 15 are installed to the X servo axis 12 and the Y servo axis 13 respectively. A holding fixture 17 is fixed to the Y servo axis 13 and is configured for fixing the sampled computer mouse 18 to be measured.

The computer 10 is connected with the servo controller 11 via a standard communication port such as a RS-232 port. The computer 10 is configured for sending an instruction to the servo controller 11 via the standard communication port. The instruction is for controlling operations of measuring the operational life of the sampled computer mouse 18. The servo controller 11 is configured for receiving and processing the instruction, and sending a control signal to the first servo motor 14 in the X servo axis 12 and the second servo motor 15 in the Y servo axis 13 correspondingly. When the control signal reaches the first servo motor 14 in the X servo axis 12, the first servo motor 14 drives the X servo axis 12 to run the Y servo axis 13 and the holding fixture 17 in the X direction. When the control signal reaches the second servo motor 15 in the Y servo axis 13, the second servo motor 15 drives the Y servo axis 13 to run the holding fixture 17 in the Y direction.

Figure 2:
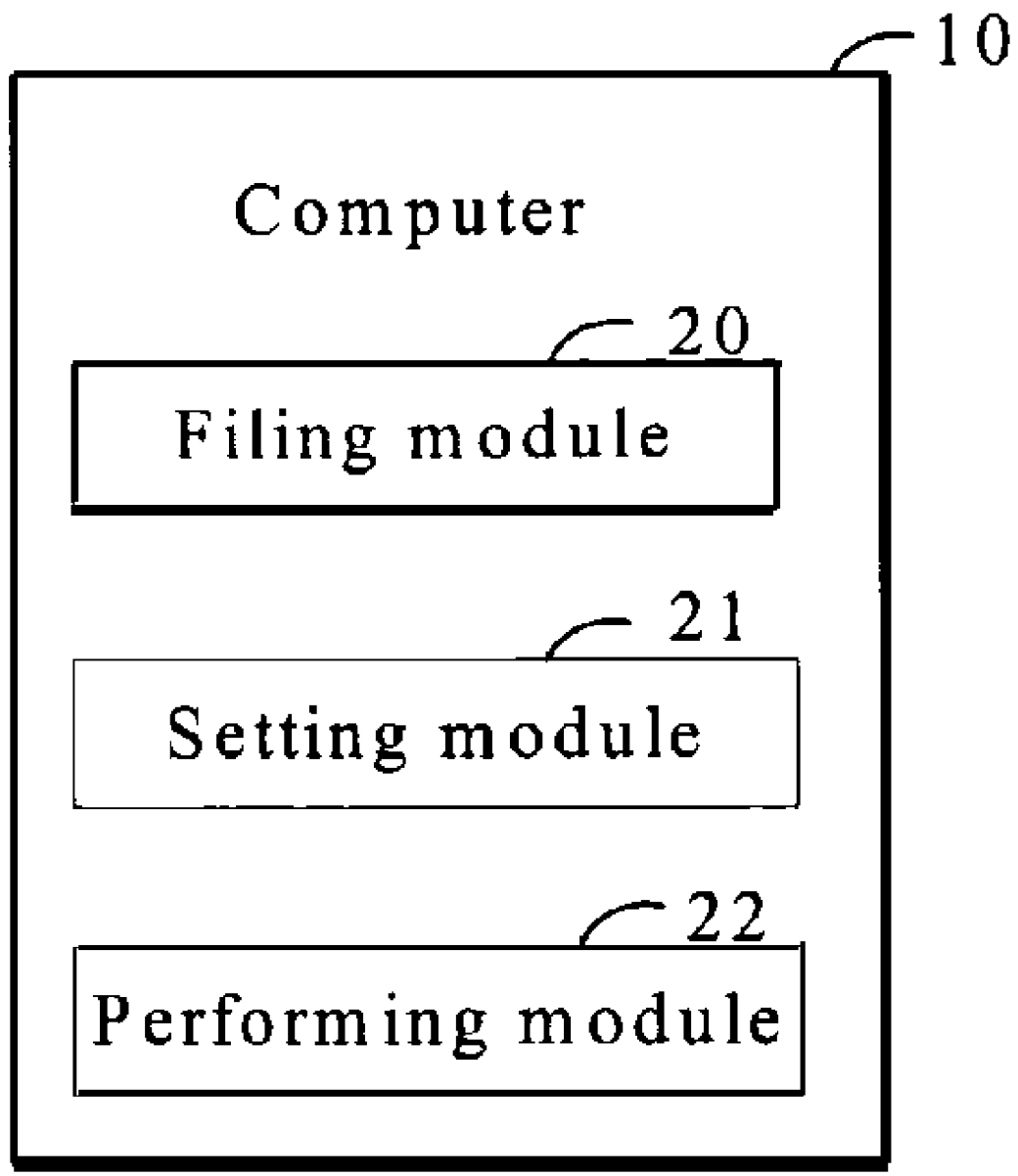
FIG. 2 is a schematic diagram of main function modules of the computer of the system of FIG. 1.

FIG. 2 is a schematic diagram of main function modules of the computer 10. The computer 10 includes a file module 20, a setting module 21, and a performing module 22.

The file module 20 is configured for receiving particular parameters corresponding to the sampled computer mouse 18 in a dialog box created by the computer 10, and for creating a new file using the parameters. The parameters may include a material number of the sampled computer mouse 18, a serial number of the sampled computer mouse 18, an aggregated running distance, an identification number of the sampled computer mouse 18, and so on. The aggregated running distance is set according to a standard operational life specification provided by the computer mouse corresponding manufacturer. Furthermore, the file module 20 can open an existing file in the computer 10 to continue any unfinished operational life measurements. The setting module 21 is configured for setting running tasks for the sampled computer mouse 18 by setting particular parameters. The parameters may include running paths of the sampled computer mouse 18, a running speed corresponding to each running path, a side length or a radius of each running path, a running distance corresponding to each running path, and so on. A total distance of each running path adds up to the aggregated running distance set in the file module 20. The running paths may take a form of a circle, a triangle, a rhombus, a pentagram, and so on.

The performing module 22 is configured for signaling the computer 10 to send the instruction to the servo controller 11, processing the instruction in the servo controller 11, sending a control signal to the first servo motor 14 and the second servo motor 15 in the X servo axis 12 and the Y servo axis 13 respectively, and initializing the holding fixture 17 and the sampled computer mouse 18 to run via the first servo motor 14 and the second servo motor 15 according to the running tasks. If the sampled computer mouse 18 completes the running tasks, this indicates the operational life of the sampled computer mouse 18 meets the operational life specification.

Figure 3:
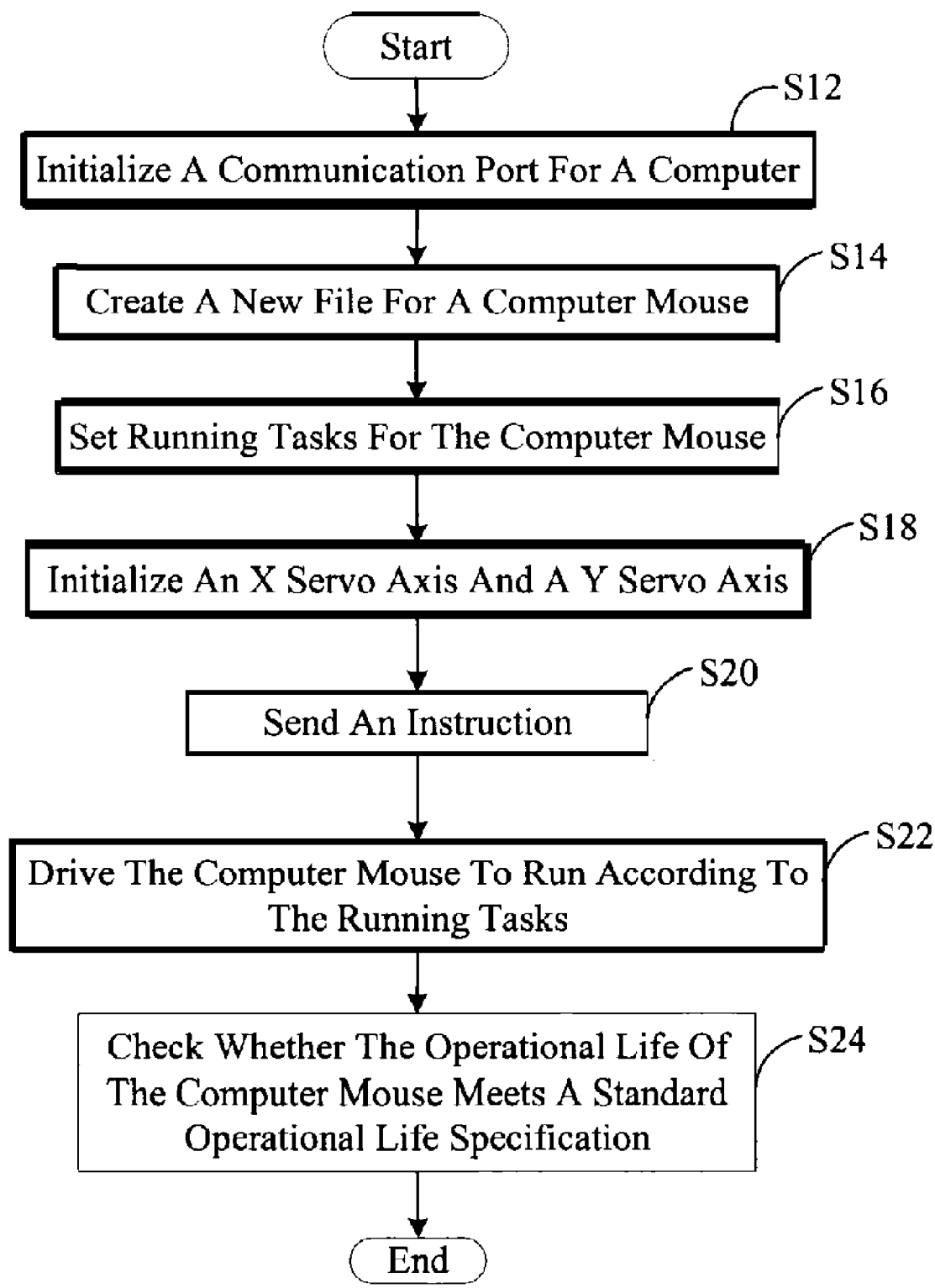
FIG. 3 is a flow chart of a preferred method for measuring operational life of a computer mouse by utilizing the system of FIG. 1.

FIG. 3 is a flow chart of a preferred method for measuring operational life of the sampled computer mouse 18. In step S12, the computer 10 initializes a communication port such as a COM1 in order to communicate with the servo controller 11 via the communication port. For example, if the communication port COM1 is set to be in use, the computer 10 communicates with the servo controller 11 via the COM1. In step S14, the file module 20 receives particular parameters about the sampled computer mouse 18 in the dialog box of the computer 10, and creates a new file for the sampled computer mouse 18 using the parameters. The parameters may include the material number of the sampled computer mouse 18, the serial number of the sampled computer mouse 18, the aggregated running distance, the identification number of the sampled computer mouse 18, and so on. The aggregated running distance is set according to a standard operational life specification provided by the computer mouse corresponding manufacturer. In step S16, the setting module 21 sets running tasks for the sampled computer mouse 18 by setting particular parameters. The parameters may include running paths of the sampled computer mouse 18, the running speed corresponding to each running path, the side length or the radius of each running path, the running distance corresponding to each running path and so on. A total distance of each running path adds up to the aggregated running distance set in the file module 20. The running paths may take the form of the circle, the triangle, the rhombus, the pentagram, and so on. In step S18, the X servo axis 12 and the Y servo axis 13 are initialized to an appointed origin location. In step S20, the performing module 22 signals the computer 10 to send the instruction to the servo controller 11 for controlling operations of measuring operational life of the sampled computer mouse 18. In step S22, the servo controller 11 processes the instruction, sends the control signal to the first servo motor 14 and the second servo motor 15 in the X servo axis 12 and the Y servo axis 13 respectively, and initializes the holding fixture 17 and the sampled computer mouse 18 to run via the first servo motor 14 and the second servo motor 15 according to the running tasks. In step S24, the users check whether the sampled computer mouse 18 completes the running tasks. If the sampled computer mouse 18 completes the running tasks, this indicates the operational life of the sampled computer mouse 18 meets the operational life specification.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for measuring operational life of a computer mouse, the system comprising:
   a computer mouse fixed in a measurement platform;
   a computer configured for setting an aggregated running distance for the computer mouse according to a standard operational life specification of the computer mouse, setting running tasks for the computer mouse according to the aggregated running distance, and sending an instruction for controlling operations of measuring operational life of the computer mouse according to the running tasks; and
   a servo controller connected with the computer, configured for receiving and processing the instruction from the computer, sending a control signal to an X servo axis and a Y servo axis in the measurement platform respectively, and making the X servo axis and the Y servo axis drive the computer mouse to run according to the running tasks, in order to check whether the computer mouse completes the running tasks to meet the computer mouse's standard operational life specification.

2. The system according to claim 1, wherein the computer comprises:
   a file module for creating a new file for the computer mouse by setting parameters, the parameters comprising the aggregated running distance;
   a setting module for setting running tasks for the computer mouse by setting parameters; and
   a performing module for signaling the computer to send the instruction to the servo controller, making the servo controller process the instruction and send a control signal to the X servo axis and the Y servo axis respectively, and making the X servo axis and the Y servo axis drive the computer mouse to run according to the running tasks.

3. The system according to claim 2, wherein the parameters for creating a new file further comprise a material number of the computer mouse, a serial number of the computer mouse, and an identification number of the computer mouse.

4. The system according to claim 2, wherein the parameters for setting running tasks comprise running paths, a running speed corresponding to each running path, a side length or radius of each running path, and a running distance corresponding to each running path.

5. The system according to claim 1, wherein the computer is connected with the servo controller via a standard communication port.

6. The system according to claim 1, wherein the X servo axis and the Y servo axis each comprise a servo motor installed therein.

7. A computer-based method for measuring operational life of a computer mouse, the method comprising the steps of:
  initializing a communication port for a computer, in order that the computer communicates with a servo controller via the communication port;
  setting an aggregated running distance for the computer mouse fixed in a measurement platform according to a standard operational life specification of the computer mouse;
  setting running tasks for the computer mouse according to the running measurement distance;
  sending an instruction for controlling operations of measuring operational life of the computer mouse according to the running tasks;
  receiving and processing the instruction from the computer, and sending a control signal to an X servo axis and a Y servo axis in the measurement platform respectively; and
  making the X servo axis and the Y servo axis drive the computer mouse to run according to the running tasks, in order to check whether the computer mouse completes the running tasks to meet the computer mouse's standard operational life specification.

8. The method according to claim 7, wherein the step of setting running tasks comprises the step of:
  setting particular parameters, the particular parameters comprising running paths of the computer mouse, a running speed corresponding to each running path, a side length or a radius of each running path, and a running measurement distance of each running path.

9. The method according to claim 8, wherein the running paths comprise circle, triangle, rhombus, and pentagram.

10. A method for measuring operational life of a computer mouse, the method comprising:
  fixing a computer mouse in a measurement platform;
  setting an aggregated running distance for the computer mouse according to a standard operational life specification of the computer mouse;
  setting running tasks for the computer mouse according to the aggregated running distance;
  sending an instruction for controlling operations of measuring operational life of the computer mouse according to the running tasks; and
  sending a control signal to an X servo axis and a Y servo axis in the measurement platform respectively, and making the X servo axis and the Y servo axis drive the computer mouse to run according to the running tasks, in order to check whether the computer mouse completes the running tasks to meet the computer mouse's standard operational life specification.

* * * * *